United States Patent

[11] 3,547,243

[72] Inventors: Raoul Joern, Lindau; Peter Reichardt, Fellbach, Germany
[21] Appl. No.: 793,340
[22] Filed: Jan. 23, 1969
[45] Patented: Dec. 15, 1970
[73] Assignee: Joern G.m.b.H.
Oeffingen, Germany
a corporation of Germany
[32] Priority: Jan. 27, 1968
[33] Germany
[31] No. 1,675,152

[54] AXIALLY SPREADING FRICTION CLUTCH
10 Claims, 4 Drawing Figs.
[52] U.S. Cl. .................................................. 192/70, 192/70.15; 70.18; 106.1
[51] Int. Cl. ............................................................. F16d 13/26
[50] Field of Search .......................................... 192/70, 70.15, 70.18, 106.1, 66

[56] References Cited
UNITED STATES PATENTS
| | | | |
|---|---|---|---|
| 939,663 | 11/1909 | Cameron | 192/70.15 |
| 2,502,798 | 4/1950 | Nabstedt | 192/70(X) |
| 3,167,163 | 1/1965 | Smirl et al. | 192/70.18 |

Primary Examiner—Allan D. Herrmann
Attorney—Karl F. Ross

ABSTRACT: A silent clutch has a flange connectable to a drive shaft and a housing connectable to a driven shaft. Two axially displaceable and rotatable clutch rings are rotationally fixed on the flange and displaceable away from same by pneumatic cylinders. On axial displacement the clutch rings frictionally engage the housing and couple the two shafts rotationally together. The rings are connected to the flange by a plurality of elongated links laying one behind the other in a circular pattern each one with one end connected to the flange and one to the ring via ball-and-socket joints. These joints have a layer of rubber between the socket formed in the link end and the ball head which layer frictionally and resiliently yields upon separation of the clutch ring from the flange and is thus stressed to return the ring to the flange in the off position of the clutch.

PATENTED DEC 15 1970

3,547,243

Raoul Jörn
Peter Reichardt
INVENTORS.

BY

Karl J. Ross
Attorney

AXIALLY SPREADING FRICTION CLUTCH

Our present invention relates to a clutch, in particular to a friction clutch for releasably rotationally connecting two rotatable shafts together.

Clutches are known wherein a drive shaft carries a flange with a plurality of axially extending teeth or splines. A clutch ring is formed so as to be angularly or rotationally entrained by these teeth and is axially shiftable relative to the flange by a lever, or a hydraulic or pneumatic cylinder.

Another flange is arranged axially in front of the clutch ring such that on displacement of this latter the two come into frictional contact and connect the first shaft with a driven shaft carrying this second flange. A coil spring returns the clutch ring to its starting position. Several rings and flanges can be provided, and the clutch surfaces are usually frustoconical for ideal braking action and automatic centering.

This type of clutch has some notable disadvantages. First of all it is noisy and operates roughly. The braking ring scrapes back and forth on the teeth, and wears out the latter, while increasing play. Also the return spring often becomes noisy. Furthermore, this constant scraping causes the teeth to wear heavily which brings about even more noise as a result of the undesirable play in the clutch. Finally the return spring takes up quite a bit of space.

One of the objects of our present invention is therefore to provide a clutch which overcomes these disadvantages.

Another object is to provide a reasonably silent and smooth-operating clutch for interconnecting two shafts.

A further object is to provide a clutch of reduced dimensions which furthermore is virtually free of wear.

We attain these and other objects by providing a clutch wherein the drive shaft is coupled by link means to a flange to each side of which is a rotatable and axially displaceable annular clutch member or ring. Beyond these rings are further rotatable clutch members coupled to the driven shaft. Mutually engageable frustoconical friction surfaces on these clutch members permit rotational coupling of them. A small piston or lever arrangement moves the inside rings out into contact with the outer members which are ideally in the form of a single housing. The central driven flange is coupled to the two inside clutch members, according to a key feature of the invention, by at least three angularly equispaced elongated links. One end of each link is connected via a ball-and-socket joint to the flange and the other end is similarly connected to the respective clutch member. These links extend tangentially to an imaginary circle having the clutch rotation axis as center and constituting the locus of the pivot axes of the cardanic universal joints which are parallel to axis of the clutch, for maximum power transfer.

According to a further feature of our invention the ball-and-socket joints comprise a ball head attached either to the flange or the clutch member, a socket formed in the respective end of the link, and a layer of rubber forming a cushion between the head and the socket. The sheaming deformation of this rubber serves to stress the joint and pull the clutch ring back toward the flange when the means for advancing it releases. The layer is bonded to at least one, preferably both, of the ball-and-socket members.

In accordance with a yet further feature of our invention these joints are made to stress the clutch ring toward the flange even when these two abut, i.e. when the links are in their normal undisplaced position, thereby compensating for loss of elasticity of the rubber or any set which it may take during use.

As is evident, the links of our invention obviate the need of teeth which are prone to wear and make noise. These links operate completely silently and with virtually no wear, with even no need of lubrication. As long as the elastic limit of the rubber layer is not exceeded, the links will last indefinitely.

The particular characteristics of the rubber in the joints determines the amount of pull exerted to return the clutch ring. Furthermore, this pull increases linearly with displacement of the ring to best return it. Only minimal angular rotation is required between frustoconical friction members and the flanges rotatably entrained therewith via the links. Another feature is that the rubber is very hard to compress thus insuring a minimal amount of play in the clutch.

Another feature of our invention provides that the links be connected either with adjacent ends connected to the same side, i.e. either the flange or clutch member. In this manner the rotational force transmitted by these links, regardless of its sense, is carried by half the links in tension (pull) and half the links in compression (push).

Should it be more desirable to transmit all the force as either a push or a pull, a further feature of our invention provides that all the ends of the links turned in the same rotational sense are connected to one side (i.e. the flange or the frustoconical axially movable clutch member) and all the ends turned in the other sense are connected to the other of these elements.

The stressing of the ball joints obviates the need for a bulky and often noisy return spring. This also allows the overall dimensions of the clutch to be reduced with equal effectiveness.

These and other objects, features, and advantages of our present invention will become apparent from the following description, reference to the accompanying drawing in which.

Figure 2:
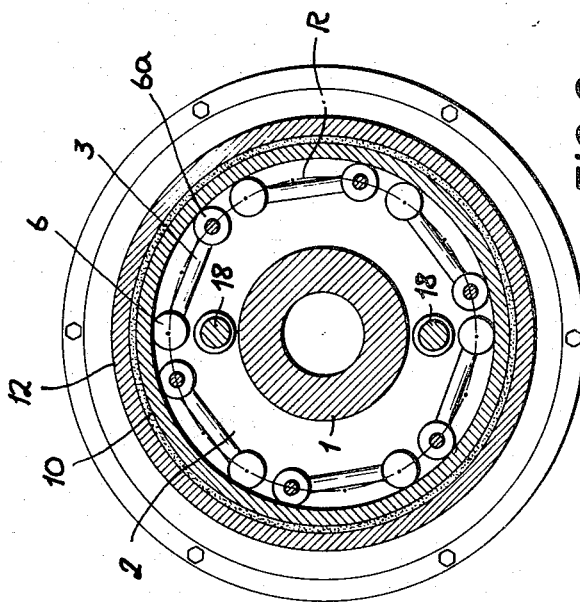
FIG. 2 is a section according to line II–II of FIG. 1.
Figure 1:
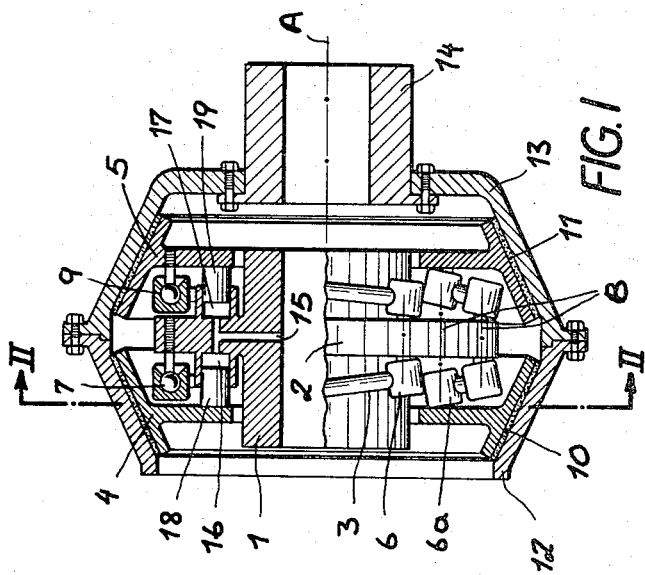
FIG. 1 is a longitudinal section through a clutch according to our invention.

As shown in FIGS. 1 and 2, a drive shaft is adapted to be held in a rotatable body or sleeve 1 on which a flange 2 is formed. To either side of this flange 2 is a respective clutch ring 4 and 5 with a frustoconical clutch surface 10 and 11. A two-part housing 12, 13 mounted on a sleeve 14 adapted to be coupled to a driven shaft has similar frustoconical surfaces which can be engaged by the clutch surfaces 10 and 11.

Small pistons 18 and 19 can be driven against the rings 4 and 5 by pneumatic or hydraulic pressure in their cylinders 16 and 17 which is fed in through a channel 15.

Links 3 couple the flange 2 to the rings 4 and 5. This is shown better in FIG. 2. Each link 3 has an end 6 attached to the flange 2 and an end 6a attached to the ring 4. With this arrangement all the rotational force is transmitted either as a pull or a push in all of the links 3. The axes B of the universal joint which allow cardanic movement, i.e. movement with two degrees of freedom, are parallel to the axis A and is on a common circle of radius R in position of the clutch.

Figure 3:
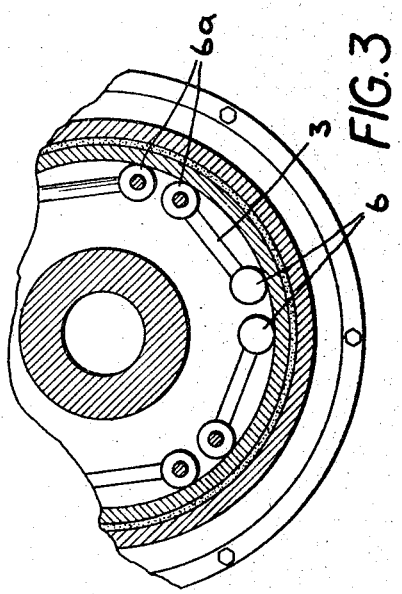
FIG. 3 is a view similar to FIG. 2 of an alternative embodiment of our invention.

FIG. 3 shows an alternative arrangement wherein adjacent ends of at least one of the links 3 are attached together at one side. In this manner, regardless of the rotational sense, half of the links transmit the force in pull and half in push.

Figure 4:
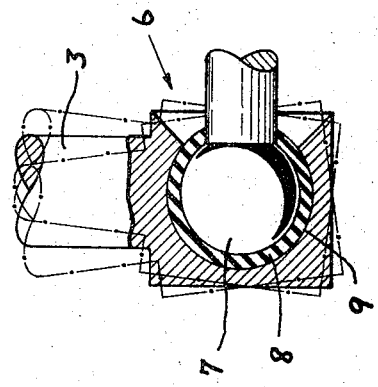
FIG. 4 is a sectional view of a ball-and-socket joint according to our invention, in enlarged scale.

In FIG. 4 the ball-and-socket joint at the end 6 of a link 3 is shown in detail. This consists of a ball head 7 with a layer of rubber 8 vulcanized to it. A socket 9 formed in the end 6 of the link 3 very tightly receives and hugs this rubber-covered head 7. The fit is so tight that the link 3 resists any angular displacement relative to the ball 7 from the position shown in dot-dash lines. In this manner, under normal conditions the link 3 is stressed to pull the ring 4 or 5 toward the flange 2. The layer of rubber can be vulcanized in situ to both members of the ball-and-socket joint.

On actuation of the pistons 18 and 19 the two rings 4 move away from the flange 2 and engage the housing halves 12 and 13 thereby entraining the sleeve 14. On release of pneumatic or hydraulic pressure in these cylinders 16 and 17, the elasticity of the rubber layer 8 quietly and surely draws the two rings back in toward the flange 2.

The improvement described and illustrated is believed to admit of many modifications within the ability of persons skilled in the art, all such modifications being considered within the spirit and scope of the invention except as limited by the appended claims.

We claim:
1. A clutch comprising:
   at least one pair of mutually engageable clutch members rotatable about an axis;
   at least one body rotatable about said axis and having a flange portion;
   means between said body and one of said members for displacing said one of said members into engagement with the other of said members;
   at least one elongated link between said flange portion and said one of said members, said link lying generally skew to said axis and having ends at substantially the same radial distance from said axis; and
   respective ball-and-socket joints connecting one of said ends of said link to said flange portion and the other of said ends to said one of said members.
2. The clutch defined in claim 1 wherein two such pairs of clutch members are provided on opposite axial sides of said body.
3. The clutch defined in claim 1 wherein a plurality of such links and a plurality of such ball-and-socket joints are provided in uniform distribution about said axis.
4. The clutch defined in claim 3 wherein said links extend transversely to said axis and lie one behind the other in a circular pattern.
5. The clutch defined in claim 4 wherein in one sense of rotation of said body, leading ends of said links are connected to said body and trailing ends of the links are connected to said one of said members.
6. The clutch defined in claim 4 wherein in one sense of rotation of said body the leading end of one link and the trailing end of the preceding link are connected to said one of said members and the trailing end of said one link and the leading end of the following link are connected to said body.
7. The clutch defined in claim 1 wherein each of said ball joints comprises a ball head, a socket receiving said head, and a layer of elastic material between said head and said socket.
8. The clutch defined in claim 7 wherein said ends of said link are formed with such sockets.
9. The clutch defined in claim 7 wherein said layer of elastic material consists of rubber and is vulcanized on said head.
10. The clutch defined in claim 9 wherein each of said ball joints is stressed to draw said one clutch member toward said body.